(No Model.)
L. T. BULLEY.
MECHANICAL MOVEMENT.
No. 416,354.                           Patented Dec. 3, 1889.
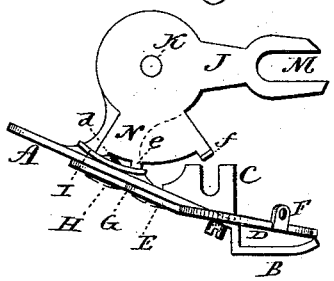
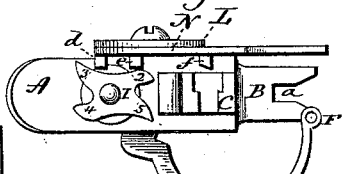
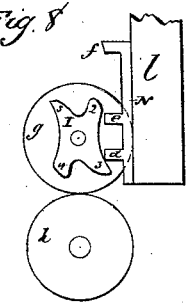
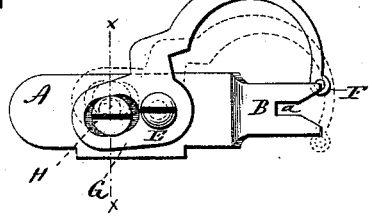
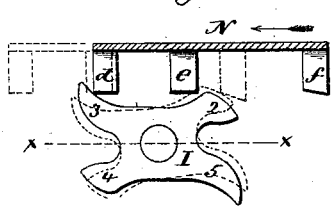
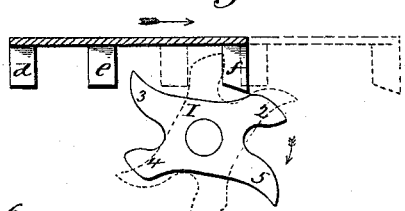
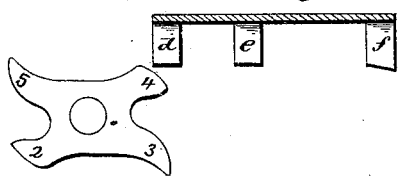
Witnesses
J. F. Shumway
Fred C. Earle
Louis T. Bulley
Inventor
By atty
John S. Earle

UNITED STATES PATENT OFFICE.

LOUIS T. BULLEY, OF NEW HAVEN, ASSIGNOR TO THE PEERLESS BUTTON HOLE ATTACHMENT COMPANY, OF TYLER CITY, CONNECTICUT.

MECHANICAL MOVEMENT.

SPECIFICATION forming part of Letters Patent No. 416,354, dated December 3, 1889.

Application filed March 15, 1889. Serial No. 303,363. (No model.)

*To all whom it may concern:*

Be it known that I, LOUIS T. BULLEY, of New Haven, in the county of New Haven and State of Connecticut, have invented a new Improvement in Mechanical Movements; and I do hereby declare the following, when taken in connection with accompanying drawings and the letters of reference marked thereon, to be a full, clear, and exact description of the same, and which said drawings constitute part of this specification, and represent, in—

Figure 1, a side view of an embroidery attachment for sewing-machines having the invention applied thereto; Fig. 2, a top or plan view of the same; Fig. 3, an under side view looking upward; Figs. 4, 5, and 6, enlarged detached views to illustrate the different positions of the operating-teeth and the cam during the full reciprocating movement of the teeth and the half rotative movement of the cam; Fig. 7, a transverse section cutting on line *x x* of Fig. 3; Fig. 8, an illustration of the invention as applied to a mechanical feeding device.

This invention relates to an improvement in mechanism for converting reciprocating movement into intermittent rotary movement, applicable for various purposes where such conversion of motion is desirable, the invention having for its object a simple mechanism for this purpose, and which will be adapted especially to sewing-machine attachments in which such a movement is desirable, but yet applicable to other mechanisms; and the invention consists in the construction, as hereinafter described, and particularly recited in the claim.

I first illustrate the invention as applied to an embroidery attachment for sewing-machines of the class in which the attachment carries a cord or braid to be swung laterally back and forth across the path of the needle, and so that the line of stitches may secure the cord thus laid in a serpentine path.

A represents the base or frame of the attachment, which terminates at its lower end in a presser-foot B. It is attached to or formed as a part of a socket C, by which it may be secured to the presser-foot arm of the sewing-machine, the presser-foot having a slot *a* in its end, through which the needle of the sewing-machine may work, as in the usual construction of this class of attachments.

D represents the cord or thread carrying arm, which is hung upon a pivot E upon the under side of the base, and so as to swing in a horizontal plane parallel with the base. The arm terminates at its free end in an eye F, through which the cord or braid is run, as usual in this class of attachments. This arm plays back and forth across the path of the needle, as indicated by broken lines in Fig. 3. It is to give this vibratory movement to the needle that this invention is applied.

From the hub of the arm D a projection G extends, constructed with a slot, in which an eccentric H works, as seen in Figs. 3 and 7, the eccentric being hung in the base A, and so that as the eccentric revolves it will impart a corresponding vibratory movement to the arm D. It is necessary that the vibratory movement of the arm shall be intermittent, so that the arm may pass across the path of the needle at one side and there stand until the stitch is made, and then return to the next side, where it will stand for the next stitch, and the operation so continues.

On the axis of the eccentric H, above the base A, is a four-pronged cam I. These prongs are respectively indicated as 2, 3, 4, and 5, Fig. 2, and also seen in Figs. 4, 5, 6, and 8.

J represents the actuating-lever, which is hung upon a pivot K on an upright L, extending upward from the base. This arm terminates at one end in a fork M, adapted for engagement with the needle-bar, as usual in this class of sewing-machine attachments. The second arm N of the lever extends downward and swings with the arm J in a vertical plane parallel with the axis of the needle-bar. The lower end of the arm N extends down into the plane of the cam I, and on its lower end three projections *d e f* are formed, which extend laterally toward the cam I. The said projections swing in a plane corresponding with the plane of the cam I, and so that the said projections may engage the corresponding prongs of the cam I, accordingly as said prongs are presented into the path of said projections. Two of the prongs of the cam 3 and 4 extend in the opposite directions to the other prongs 2 and 5, the prongs 2 and 3 being at one side of a longitudinal line through the cam and the other prongs 4 and 5 being upon the opposite side of the same line, as seen in Fig. 4, the broken line $x\ x$ indicating the line referred to. The projections 2 and 4 are alike and the projections 3 and 5 are alike. The prongs 3 and 5 present a horn shape or concavo-convex surface running to substantially a point, while the prongs 2 4 present simply a rounded surface. The lever imparts to the projections $d\ e\ f$ substantially a reciprocating movement in the plane of the cam I. The operation of these reciprocating projections and the cam is as illustrated in Figs. 4 and 5. In Fig. 4 the projections, or what I will call "teeth," are moving in the direction indicated by the arrow. The tooth $d$ has just come into contact with the prong 3. Now the prong 2 is out of the path of the next advancing tooth $e$, so that the tooth $e$ will escape the prong 2; but, the teeth advancing, the tooth $d$, operating upon the prong 3, will turn the cam backward to the position indicated in broken lines, so that the tooth $d$ may escape from the prong 3. This movement of the cam will bring the rounded surface of the prong 2 into the path of the last tooth $f$. The tooth $e$ will also escape the prong 3, and the tooth $f$ will in its turn strike the prong 2, and, passing over its surface to the position seen in Fig. 5, will force the prong 2 out of the path of the tooth and bring the prong 3 back into the path of the teeth $d\ e$, which now stand behind that prong 3, as seen in Fig. 5. This completes the movement of the teeth in one direction. On the return the tooth $e$ will now engage the back of the prong 3, and, moving in the direction indicated by the arrow, Fig. 5, will cause the cam to turn upon its axis in the direction indicated by the arrow. The teeth $e\ d$ work into the prongs 3 and 4 like the teeth of a rack into a pinion, and will turn the cam, as indicated in broken lines, Fig. 5, and so continuing its rotation until the teeth $e\ d$ have passed from engagement with the prongs, as indicated in Fig. 6, which is the extreme advanced position of the teeth. This will leave the prong 4 standing in the path of the tooth $d$ when it returns, and that tooth $d$, striking the prong 4, as before, and as seen in Fig. 4, will return the cam to bring the prong 4 into the path of the last tooth $f$, and as first described with reference to the prongs 2 and 3. Then on the next return of the tooth the prongs 5 and 2 will be engaged in like manner as 3 and 4 were engaged, and another rotation will be imparted to the cam like that of the first, each rotation being one-half a full revolution, as from the position of Fig. 4 to that in Fig. 6, and then from the position in Fig. 6 to that in Fig. 4. Thus under the reciprocating movement imparted to the teeth $d\ e\ f$ an intermittent rotary movement is imparted to the cam and a corresponding movement to the eccentric I, to which the cam is fixed, and this eccentric operates upon the arm D first to throw it to one side of the path of the needle and then return it, as indicated in Fig. 3.

As another illustration for the use of this movement, in Fig. 8 I represent it as applied to an intermittent feed—say as for a power-press and for other purposes—in which the cam I is arranged upon the axis of one of the feed-rolls $g, h$ representing the other feed-roll. $l$ represents the slide of the press, from which an arm projects carrying a vertical rack N, corresponding to the arm N in the first illustration, and the rack provided with three teeth $d\ e\ f$, the same as the teeth of Fig. 4. Now it will be evident as the slide moves downward the operation will be the same as that described in the movement from the position in Fig. 4 to that in Fig. 5, when no rotation will be imparted; but on the return or upstroke the cam will be rotated, as before described, from the position seen in Fig. 4 to that seen in Fig. 6, and, so continuing, will impart corresponding rotation to the rolls to feed during the ascent of the slide. This illustration will be sufficient to enable others skilled in the art to apply the movement where it is desired to convert reciprocating movement into intermittent rotary movement.

I claim—

The herein-described mechanism for converting reciprocating into intermittent rotary motion, consisting in the cam I, constructed with four prongs 2 3 4 5, combined with a reciprocating rack composed of three teeth $d\ e\ f$, working in the plane of the said prongs, substantially as described, and whereby in the movement in one direction the said teeth escape the said prongs of the cam, but on the return engage therewith and impart rotation thereto.

LOUIS T. BULLEY.

Witnesses:
B. O. PRATT,
H. B. BROWER.